United States Patent [19]

Levesque et al.

[11] 4,019,720
[45] Apr. 26, 1977

[54] METHOD AND APPARATUS FOR MIXING VISCOUS MATERIALS

[75] Inventors: Gerard A. Levesque, Hudson; Glen E. W. Saidla, Hampton Falls, both of N.H.

[73] Assignee: Exxon Research and Engineering Company, Linden, N.J.

[22] Filed: Oct. 16, 1975

[21] Appl. No.: 623,104

[52] U.S. Cl. .............................. 259/4 R; 261/124; 261/DIG. 75; 302/30
[51] Int. Cl.² ........................................ B01F 15/00
[58] Field of Search ... 259/4 R, 147, 151, DIG. 24; 302/29, 30, 31; 261/124, DIG. 75, 76, 79 A, 118

[56] References Cited
UNITED STATES PATENTS

| | | | |
|---|---|---|---|
| 1,120,535 | 12/1914 | Pruden | 259/151 |
| 1,451,063 | 4/1923 | Anthony | 261/79 A |
| 3,047,275 | 7/1962 | Cox | 259/4 R |
| 3,226,036 | 12/1965 | Grahn | 259/151 |
| 3,462,083 | 8/1969 | Kantz | 259/4 R |
| 3,582,046 | 6/1971 | Mueller | 259/4 R |
| 3,641,743 | 2/1972 | Hoffmann et al. | 261/79 A |
| 3,888,465 | 6/1975 | Terwilliger et al. | 259/4R |

Primary Examiner—Richard E. Aegerter
Assistant Examiner—John W. Shepperd
Attorney, Agent, or Firm—Joseph J. Dvorak

[57] ABSTRACT

A stream of fluid mass, particularly a viscous fluid mass, is mixed by dividing the stream by high pressure fluid means into a plurality of substreams and imparting a predetermined rotational flow pattern in a first direction to alternate substreams and imparting a rotational flow pattern opposite in direction to said first direction to the remaining substream. An apparatus for achieving the foregoing is described.

6 Claims, 5 Drawing Figures

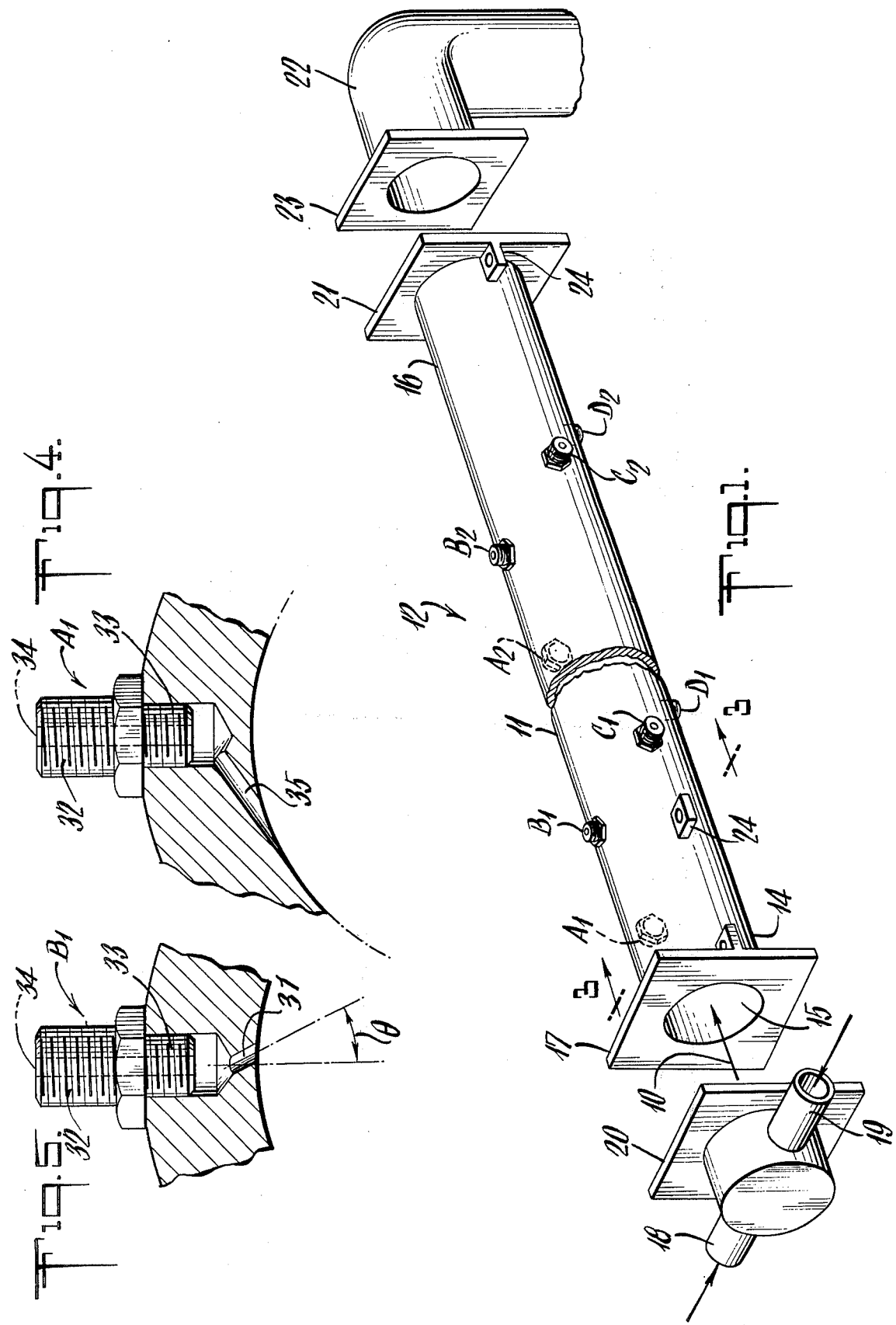

METHOD AND APPARATUS FOR MIXING VISCOUS MATERIALS

BACKGROUND OF THE INVENTION

1. Field of the Invention

The present invention relates to mixing techniques and devices. More particularly, the present invention relates to a method and apparatus for mixing a highly viscous fluid mass be altering the flow pattern of a viscous fluid stream so as to generate interfacial surfaces in the fluid mass.

2. The Prior Art

The thorough mixing of extremely viscous material has been a problem of considerable commerical concern. One approach to mixing viscous materials involves transporting a viscous fluid mass through a conduit containing baffles or other obstructions which serve to split the stream of fluid materials flowing through the conduit, effectively spreading the stream out and creating a large surface area, and then combining the streams again in an overlapped type of relationship so as to provide relatively efficient mixing without turbulence and independent of the flow rate of the reacting stream. Typical of such devices are those described in U.S. Pat. No. 3,239,197 and U.S. Pat. No. 3,664,638, for example. Among the deficiencies of the type of mixing devices just mentioned are the relatively large pressure drops associated with extensive internal baffles and the difficulty of cleaning such devices particularly when the fluid mass is a highly reactive material such as a thermoset resin which rapidly sets and cures into a solid mass.

SUMMARY OF THE INVENTION

It its simplest sense, the present invention provides a method for mixing a stream of fluid mass, particularly a viscous fluid mass, by dividing the stream of fluid mass into a plurality of substreams, imparting a predeterminted rotational flow pattern in a first direction to alternate substreams and imparting a predetermined rotational flow pattern opposite in direction to said first direction to the remaining substreams.

In a preferred embodiment of the present invention, a highly viscous fluid is mixed by establishing a stream of fluid mass. This stream is divided into a plurality of substreams by subjecting said stream of fluid mass to the impingement of a plurality of jets of high pressure fluid, preferably a gas, at predetermined points along the stream of fluid mass. A predetermined rotational flow is imparted in a first direction to alternate substreams, for example, substream 1, 3, 5, 7, etc. by subjecting these alternate substreams to a tangentially impinging jet of the high pressure fluid. The remaining substreams, for example, substream 2, 4, 6, 8, etc. are rotated in a predetermined flow opposite in direction to the first rotational direction by the tangential impingement of a jet of the high pressure fluid.

In another embodiment of the present invention, a static mixer is provided for mixing very viscous and even rapidly reacting materials. The mixing device consists of an elongated tube or conduit through which the reactant materials are forced. Based at predetermined locations along the elongated tube are a plurality of means for introducing a jet of a high pressure fluid, preferably a gas, at substantially right angles to the longitudinal axis of the tube so as to divide a stream of reactant materials into a plurality of substreams. Also spaced at predetermined locations along the elongated tube or conduit are a plurality of means for introducing jets of the same or different high pressure fluid substantially tangential to the inner surface of the elongated tube or conduit. Preferably the elongated tube or conduit has a circular cross-section. Also, preferably the means for introducing jets of high pressure fluid are spaced at substantially equal distance along the elongated tube. Preferably, each means for introducing a jet of high pressure fluid is based at right angles with respect to the next successive means for introducing a jet of high pressure fluid.

In a particularly preferred embodiment of the present invention, a stream of highly viscous material is forced through a conduit or pipe. This stream is divided into a plurality of substreams by means of the impingement of a jet of high pressure fluid, such as air, which is introduced through a nozzle means located at substantially right angles to the longitudinal axis of the pipe at a plurality of locations along the periphery of the pipe. The alternating substreams are given a rotational motion in a first direction by introducing a high pressure fluid, such as air, tangential to the inner periphery of the pipe. The remaining substreams are given a rotational motion opposite to the first direction by the introduction of a high pressure fluid, such as air, tangential to the inner periphery of the pipe by a plurality of nozzle means located along the periphery of the pipe.

The broad outline of the method and apparatus of the invention will be more clearly understood from the detailed description which follows, taken with the accompanying drawings.

BRIEF DESCRIPTION OF THE DRAWINGS

FIG. 1 is a perspective and isometric view of a simple form of device according to the present invention.

FIG. 4 is a side elevation of a nozzle used for introducing a high pressure fluid tangential to the inner surface of the device according to the present invention.

FIG. 5 is a side elevation of a nozzle used for dividing the stream of fluid mass into substreams in accordance with the present invention.

DETAILED DESCRIPTION OF THE INVENTION

Figure 3:
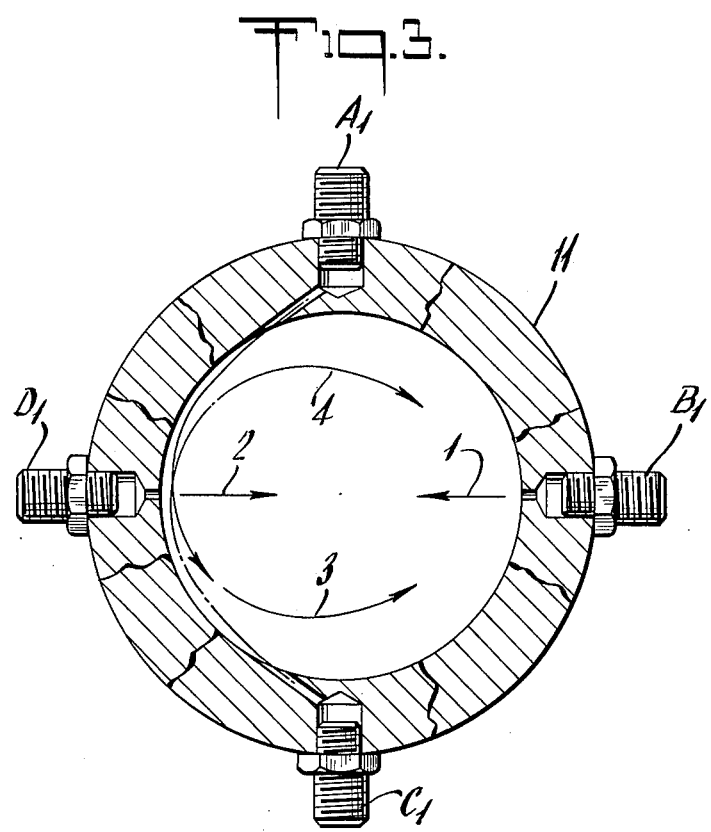
FIG. 3 is a cross-sectional along lines 3—3 of FIG. 1 partly cut away and partly showing the directional motion of the impinging fluid streams.

A particularly desirable application of the present invention is in rapidly mixing extremely viscous reactive materials such as a foamable liquid resin composition, particularly a foamable resin composition containing reinforcing fibers, solid fillers and the like. Thus, the present invention will be described with reference to this particular desirable application. It should be understood, however, that the invention is not intended to be limited strictly to the specific embodiments shown and described herein but may be modified extensively while still within the spirit of the present invention.

In preparing a fiber-reinforced plastic foam it is necessary to introduce resin precursors premixed with fiberglass and other reinforcing material into the mixer simultaneously with a catalyst (if desired), blowing agents and other ingredients desired. These reactant materials must be mixed thoroughly and rapidly since within a very short period of time they will begin to react. Accordingly, they must be quickly placed in a mold immediately after mixing so the foaming process may occur therein. Thus, referring to the drawings and particularly to FIG. 1, a mixer embodying the invention is indicated generally at 12. A stream of viscous material of the type mentioned above is shown as line 10 entering opening 15. Precisely predetermined quantities of viscous materials can be supplied to the mixing device 12 by means of precision volumetric control pumps and the like (not shown).

In any event, the viscous stream of material enters the first passageway at 15 and is caused to flow through the elongated tube or conduit 11 of mixer 12 by a ram or plunger of a pumping device, for example.

As can be seen in FIG. 1, the mixing device is an elongated tube or conduit 11 which has a first end 14 and a second end 16. In a preferred embodiment of the present invention the mixer 12 is provided with a mounting flange 17 for operatively connecting the inlet end of the mixer to a metering and pumping system. Thus, as is shown, entrance passages 18 and 19 are providing for the flow of liquid reactants from meters and pumps (not shown) into the principle flow passage of mixer 12 through opening 15 at first end 14. Thus, flange 17 provides a convenient mounting means for mounting the mixer and a suitable entrance support system having a corresponding flange such as flange 20.

As can be seen, the mixer 12 is also provided with a second flange 21 at second end 16 for cooperatively mounting with any desired distribution system. Thus, elbow 22 is mounted on a flange 23 and when operatively connected with mixer 12, the thoroughly mixed stream of material exiting the mixer at second end 16 can be discharged, for example, downwardly onto a suitable mole (not shown).

At various intervals along the length of mixer 12 are a series of mounting blocks 24 for supporting the mixer in a suitable position. Other mounting means, of course, can be employed.

Spaced along the conduit or elongated tube 11 which forms the central mixing chamber 12 of the present invention are a plurality of nozzle means for introducing a high pressure fluid into the reactor substantially radially so as to divide a stream of material flowing through the mixer into a plurality of substreams. These dividing means are shown as nozzles $B_1$, $D_1$, $B_2$ and $D_2$ in FIG. 1. As can be seen in FIG. 3, it is preferred that each dividing nozzle be substantially at 180° with respect to the next dividing nozzle. Thus, $D_1$ is on the opposite side of the tubular body portion 11 of mixer 12 than $B_1$, but spaced further along the longitudinal axis.

Further in accordance with the preferred embodiment of the present invention as shown in FIG. 5, the dividing nozzles or jet fittings such as $B_1$ are inclined generally at an angle, $\theta$, of about 10° with respect to the radius of the tubular body portion so as to deliver a jet of high pressure fluid that has both a forward component as well as a radial component, for the purposes hereinafter discussed.

Returning again to FIG. 1, it can be seen that the plurality of means for introducing a high pressure fluid tangential to the periphery of the main tubular section of mixer 12 is provided. These fluid stream rotating nozzles are designated as $A_1$, $C_1$, $A_2$ and $C_2$ in the FIG.

Figure 2:
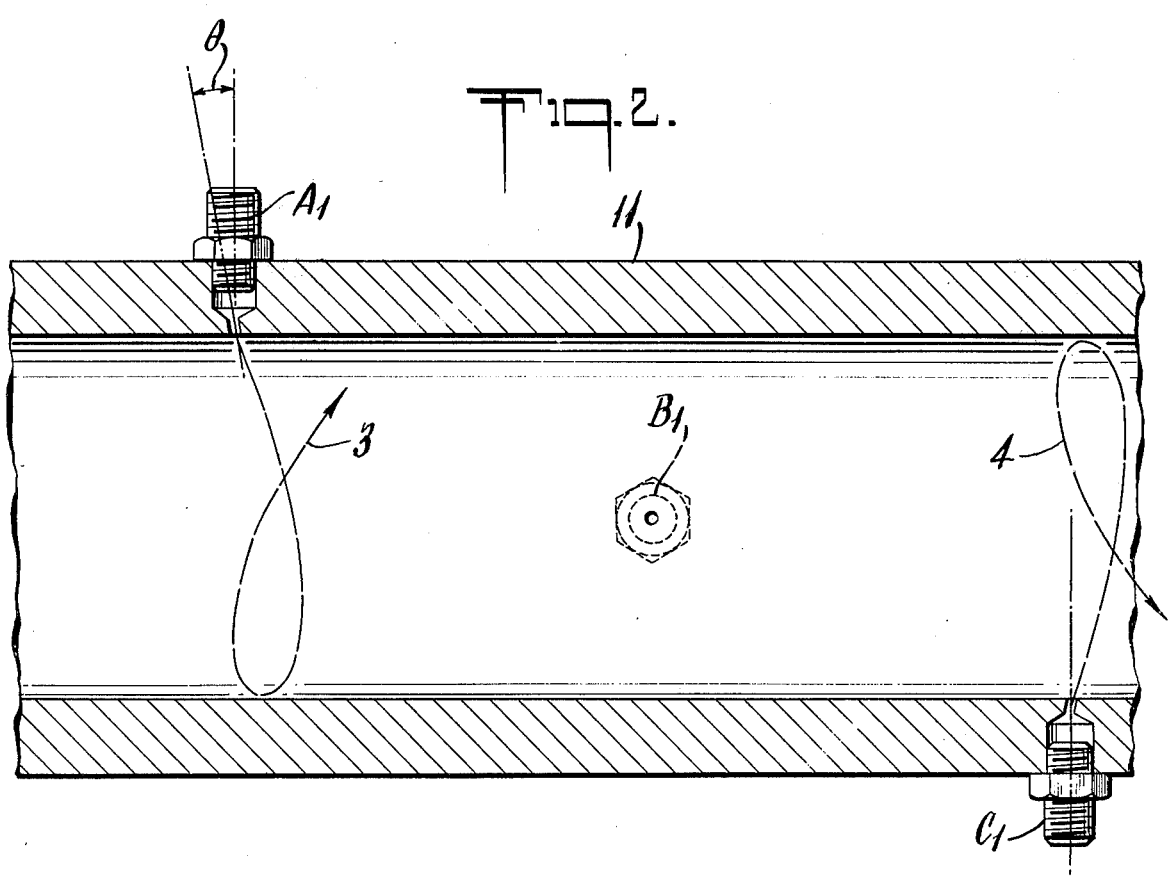
FIG. 2 is an enlarged partial view, partly in section, diagrammatically showing the fluid flow in the device of FIG. 1.

As can be seen particularly with regard to FIG. 3, these nozzles, $A_1$ and $C_1$ for example, are arranged on opposite sides of the main tubular body portion of mixer 12. Thus, as can be seen in FIG. 2, these nozzle fittings also are inclined at an angle, $\theta$, of about 10° with respect to the radius of the main tubular section so as to impart a high pressure rotation fluid stream having both a forward component and a tangential component thereby rotating a substream in a clockwise or counterclockwise fashion. Indeed, the tangential component is so arranged that alternating nozzles will have a first tangential entry direction and the remaining will have a second tangential direction opposite from said first tangential direction.

In FIG. 3, lines 1, 2, 3 and 4, diagrammatically depict the general directional movement of the high pressure fluid introduced via each respective nozzle. Thus, the high pressure fluid introduced via fluid stream divider nozzles $B_1$ and $D_1$ enters generally radially as is indicated by lines 1 and 2 respectively. The high pressure fluid introduced via the tangential nozzles $A_1$ and $C_1$ have opposite rotational directions shown by lines 3 and 4 respectively. Thus, the rotational direction of fluid entering via $C_1$ is clockwise whereas the rotational direction of fluid entering via $A_1$ is counterclockwise. This clockwise, counterclockwise rotational direction is also shown in FIG. 2.

The number of nozzles for dividing a main stream and the number of nozzles to provide substreams and the number of nozzles for rotating the various substreams may be varied to give the desired performance for any specific viscous liquid mixing problem. As should be appreciated, the apparatus also may be constructed from any of a wide variety of materials including metal and the like, the choice of materials being predicated upon the particular conditions which will be encountered in the situation for which the apparatus is designed.

As is shown in the drawings, and in particular in FIGS. 4 and 5, various nozzle means include threaded inserts for suitably connecting the nozzle means to a source of high pressure fluid. Thus, threads 32 permit easily connecting a source of high pressure fluid to the mixer. Also threads 33 permit easy removal of the insert portion for cleaning, if necessary, of the radially directing opening 31 of $B_1$ and the tangential opening 35 of $A_1$.

Generally, in the practice of the present invention the high pressure fluid employed will be a gaseous material such as air or nitrogen; however, the fluid material introduced under high pressure may also be one of the components of the main fluid stream to be mixed.

The operation of all or any of the previously illustrated embodiments of the present invention and the method thereof is substantially achieved as follows:

a. A stream of relatively viscous material is established by introducing the material to be mixed at first end 14 of the mixer 12. For example, polyurethane resin precursor with fiberglass is metered and introduced through passageway 18 and catalyst and blowing agent is metered and introduced via passage 19 thereby establishing stream 10 for a transversed flow through the tubular conduit 11 of mixer 12.

b. The main stream thus established is divided into a plurality of substreams by the high pressure fluids introduced at spaced predetermined positions along the longitudinal axis of the main stream and substantially radial thereto, for example, via $B_1$, $D_1$, $B_2$ and $D_2$.

c. The substreams are then rotated in a predetermined flow pattern by the high pressure fluid introduced tangentially at spaced predetermined positions along the longitudinal axis of the main stream, for example, via $A_1$, $C_1$, $A_2$ and $D_2$. It should be noted that alternate substreams have imparted to them a first predetermined rotational flow pattern in a first direction which is opposite to the predetermined rotational flow pattern imparted to the remaining substreams. Thus, for example, a plurality of substreams will be given a clockwise rotational motion while alternate substreams will be given counterclockwise rotational motion.

The net effect of dividing the stream of viscous material into substreams and rotating the various substreams in opposite directions is to continually divide and recombine the substreams so that complete mixing is achieved. Thus, the viscous material is forced to flow through a serpentine path without being in contact with dams or baffles or other such internal arrangemments. Thus, in the case of forming a foamable resin composition of the type which will typically foam and begin to set within about 30 seconds after the foam components begin to come into contact with each other, the device of the present invention offers considerable advantage in regard to cleaning the mixer after each use.

What is claimed is:

1. A method for mixing a viscous fluid mass comprising:
   establishing a stream of fluid mass containing components to be mixed;
   subjecting said stream of fluid mass to the impingement of a plurality of jets of high pressure fluid at predetermined points along the stream of fluid mass thereby dividing said stream of fluid mass into a plurality of substreams;
   subjecting alternate substreams to a tangentially impinging jet of high pressure fluid thereby imparting a predetermined rotational flow pattern in a first direction to said alternate substreams; and,
   subjecting the remaining substreams to a tangentially impinging jet of high pressure fluid thereby imparting a predetermined rotational flow pattern opposite in direction to said first direction to the remaining substreams whereby interfacial surfaces are generated and recombined thereby mixing said components of said viscous fluid mass.

2. The method of claim 1 wherein said high pressure fluid is a gas, which is not reactive with the components being mixed.

3. The method of claim 2 wherein the high pressure fluid is a component to be mixed with the main stream.

4. A static mixer for mixing viscous material comprising:
   an elongated tube having a first end and a second end for transversal therethrough toward said second end by a stream of viscous material to be mixed;
   a plurality of successive first nozzle means being spaced at predetermined locations along said elongted tube, said nozzle mean having a substantially radially directed entry port inclined in a forwardly direction toward said second end of said elongated tube at an angle of about 10° with respect to the radius of said elongated tube for introducing jets of high pressure fluid substantially radially to the longitudinal axis of said elongted tube and in a forwardly direction, each succeeding first nozzle means being located on opposite sides of the elongated tube from the preceding first nozzle means;
   a plurality of successive second nozzle means being spaced at predetermined locations along said elongated tube, alternate members of said second nozzle means having a substantially tangentially directed entry port and inclined in a forwardly direction toward said second end of said elongated tube at an angle of about 10° with respect to the radius of said elongated tube for introducing jets of high pressure fluid in a first substantially tangential and forward direction, and the remainder of said second nozzle means having a substantially counter tangentially directed entry port and inclined in a forwardly direction toward said second end of said elongated tube at an angle of about 10° with respect to the radius of said elongated tube for introducing jets of high pressure fluid in second substantially tangential and forward direction, each succeeding second nozzle means being located along the elongated tube at a point which is between two successive first nozzle means.

5. An apparatus for mixing a fluid mass comprising:
   an elongted tube having a first end and a second end whereby the material to be mixed is introduced into said first end, transverses said tube and exits at said second end;
   a plurality of successive first nozzle located at predetermined intervals along said elongated tube having a substantially radially directed conduit for introducing a high pressure fluid whereby a stream of viscous material travelling from said first end to said second end will be divided into a plurality of substreams when subjected to the impingement of high pressure fluid from said nozzles, each succeeding first nozzle means being located on opposite sides of the elongated tube from the preceding first nozzle means;
   a plurality of successive second nozzles having substantially tangentially directed conduits for delivering a high pressure fluid substantially tangential to the inner surface of said conduit, each one of said second nozzles being located between two of said first nozzles along said tube and alternate second nozzles having conduits which are in opposite tangential relationship to that of the preceding nozzle, whereby the plurality of substreams will be given rotational motion when subject to the impingement of high pressure fluid from said nozzle and whereby the rotational motion imparted to each successive substream will be in opposite direction to the next substream, each of said second nozzles being located on opposite sides of the elongated tube from the preceding second nozzle.

6. The apparatus of claim 5 wherein the conduit of the first and second nozzles are inclined toward the second end of the elongated tube at an angle of about 10° with respect to the radius of the tube whereby said substreams when subjected to the impingement of high pressure fluid have a forward motion also imparted thereto.

* * * * *